United States Patent [19]

Sato et al.

[11] 4,319,320

[45] Mar. 9, 1982

[54] SYSTEM AND METHOD FOR ADAPTIVE CONTROL OF PROCESS

[75] Inventors: Yoshio Sato, Hitachi; Nobuo Kurihara, Hitachiota; Masahide Nomura, Hitachi; Shigeyoshi Kawano, Kure; Tadayoshi Saito, Hitachiota, all of Japan

[73] Assignee: Hitachi, Ltd., Tokyo, Japan

[21] Appl. No.: 41,646

[22] Filed: May 23, 1979

[30] Foreign Application Priority Data

May 24, 1978 [JP] Japan .................................. 53-61008

[51] Int. Cl.³ ............................................. G05B 13/02
[52] U.S. Cl. ................................... 364/165; 364/116; 364/494; 60/665
[58] Field of Search ............... 364/105, 106, 116, 118, 364/492, 494, 495; 60/660–667

[56] References Cited

U.S. PATENT DOCUMENTS

| | | | |
|---|---|---|---|
| 3,473,008 | 10/1969 | Bay et al. | 364/116 X |
| 3,619,360 | 11/1971 | Persik, Jr. | 364/116 X |
| 3,758,762 | 9/1973 | Littman et al. | 364/116 |
| 3,791,793 | 2/1974 | Friedmann et al. | 23/230 A |
| 3,894,396 | 7/1975 | Durrant | 60/665 |
| 4,151,589 | 4/1979 | Ross | 364/116 X |

FOREIGN PATENT DOCUMENTS 528344 2/1956 Fed. Rep. of Germany ...... 364/118

*Primary Examiner*—Joseph F. Ruggiero
*Attorney, Agent, or Firm*—Craig and Antonelli

[57] ABSTRACT

A system and method for the adaptive control of a process in which a feed forward control signal corresponding to a process demand is calculated according to a predetermined algebraic function, while a feedback correction signal is calculated on the basis of an error of a process feedback signal indicative of an error of a controlled variable from a predetermined setting, and the controlled variable of the process is controlled on the basis of the sum of these two signals. The adaptive control is such that, when a set point of the function deviates from the actual process demand, a value corresponding to the error appears in the feedback correction signal, and this value is used for automatically modifying the function itself to ensure the adaptive control of the process. A determination is made whether or not the process is in the steady state and when steady state operation is determined, the function of the feed forward control signal is modified.

15 Claims, 10 Drawing Figures

SYSTEM AND METHOD FOR ADAPTIVE CONTROL OF PROCESS

BACKGROUND OF THE INVENTION

This invention relates to a process control system which controls a process by the combination of feed forward control and feedback control, and more particularly to a process control system suitable for the adaptive control of a process whose dynamic characteristics are variable depending on the factors such as secular variations.

A process control method is well known in which a feed forward control signal is determined as a function of a demand for a specific process and is modified on the basis of a process feedback signal applied from a feedback loop of a controlled variable for determining by calculation the desired value of the control variable of the process. Such a control method is commonly employed for the control of various processes.

Such a control method is disclosed in, for example, U.S. Pat. No. 3,894,396. In this U.S. patent, the desired values of flow rates of feed water, fuel, air and recirculation gases supplied to a boiler in a heat power plant are arithmetically calculated according to individual predetermined rates so that they meet the plant load demand. A feed forward control signal is produced on the basis of these calculated flow rate values to be used for the control of the opening of a feed water control valve, a fuel control valve, an air flow control damper and a gas recirculation flow control damper which control actually the flow rates of feed water, fuel, air and recirculation gases supplied to the boiler. The feed forward control signal is modified by individual feed forward modifying signals obtained by arithmetic calculations based on a main steam pressure error, a main steam temperature error, an $O_2$ error and a gas recirculation flow error, so that the modified feed forward control signal can be used to control the opening of the feed water control valve, fuel control valve, air flow control damper and gas recirculation flow control damper. The rates used for the determination of the feed forward control signal are calculated according to algebraic functions which are so pre-selected that the main steam pressure error, main steam temperature error, $O_2$ error and gas recirculation flow error are zero in the steady state of the process. Therefore, when these functions are always appropriate, the feedback correction signals act to absorb solely transient variations in the controlled variables so that the entire plant can be controlled to operate with a quick response.

However, the performance of such a power plant varies gradually due to deposit of soot in the boiler, contamination of pipe inner walls and other secular variations. Thus, even when the functions used for the arithmetic calculation of the feed forward control signal were originally properly set, these functions would become unfit for the purpose of control of the controlled variables after an extended period of continuous operation, and the resultant errors would be absorbed in the feedback correction signals. Since the feedback control system would not respond until an error appears in the parameter of one or more of the controlled variables, the process control with the quick response as in the initial stage of plant operation would become impossible in such a situation.

In order to prevent the undesirable reduction in the response of the process control system due to such secular variations of the characteristics of the controlled variables, it has been a common practice to periodically re-set the functions used for the determination of the feed forward control signal. However, this re-setting has required a great deal of costs and labors.

SUMMARY OF THE INVENTION

It is an object of the present invention to provide an improved process control method and system according to which the functions used for the determination of the feed forward control signal generated from the feed forward control system can be automatically modified so that the process can be continuously controlled to make a quick response to variations.

Another object of the present invention is to provide a process control method and system according to which the functions used for the determination of the feed forward control signal generated from the feed forward control system can be modified at a proper time.

Still another object of the present invention is to provide a process control method and system according to which the functions used for the determination of the feed forward control signal can be properly modified during progression of the process even when the initial set points of the functions are not appropriate.

It is a first feature of the control method and system according to the present invention that whether the process is in its steady state or not is detected, and when the process is proved to be maintained in the steady state, the feedback correction signals appearing from the feedback correction system in the steady state of the process are successively transferred to the feed forward control system so as to modify the functions used for the determination of the feed forward control signal. Thus, the feed forward control system which generates the feed forward control signal determines or modifies the functions in quick response to variations of the process demand so that any appreciable error inputs may not be applied to the feedback correction system. Therefore, the response of the feedback correction system itself can be improved, and the response of the entire control system would not be reduced regardless of secular variations in the characteristics of the controlled variables in the process.

It is a second feature of the control method and system according to the present invention that, when variance of any one of the process parameters is less than a predetermined reference value within a predetermined period of time, the process is judged to be maintained in its steady state, and the functions used for the determination of the feed forward control signal generated from the feed forward control system are modified only when the process is proved to be in its steady state.

It is a third feature of the control method and system according to the present invention that, among the set points of any one of the functions used for arithmetically calculating the feed forward control signal on the basis of the value of the process demand, those corresponding to the demand values close to an instantaneous value of the process demand are only modified or corrected when modification or correction is required.

DESCRIPTION OF THE PREFERRED EMBODIMENTS

Figure 1:
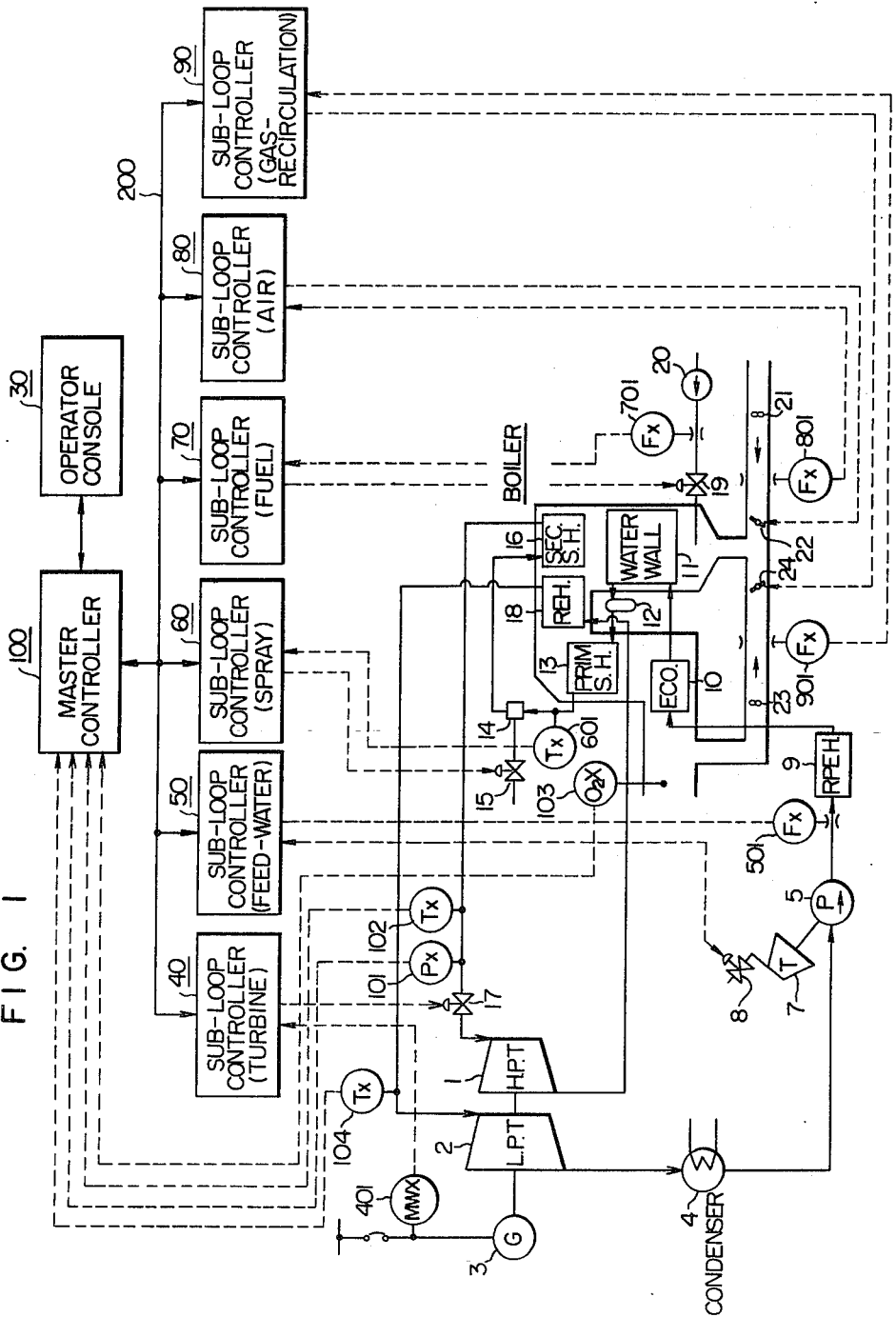
FIG. 1 is a block diagram showing connections between controlled units and control units in an embodiment of the present invention which is applied to a control system for a heat power plant.

FIG. 1 is a block diagram showing connections between controlled units and control units in an embodiment of the present invention which is applied to a control system for a heat power plant.

Referring to FIG. 1, an electric generator 3 is mechanically connected to a high pressure turbine 1 and a low pressure turbine 2 to be driven by these turbines. Steam discharged from the low pressure turbine 2 is condensed in a condenser 4. A feed water pump 5 driven by a feed pump drive turbine 7 pumps the condensate from the condenser 4 to supply it as feed water to a boiler. The flow rate of boiler feed water is controlled depending on the opening of a steam flow control valve 8 which controls the flow rate of steam supplied to the feed pump drive turbine 7. The feed water supplied from the feed water pump 5 is heated in a pre-heater 9 by extraction steam extracted from the low pressure turbine 2 and is then further heated in an economizer 10. The feed water is then turned into steam by a water wall 11 of the boiler. The steam, from which non-vaporized water is separated in a water separator 12, is further heated in a primary superheater 13 and passes through an attemperator 14 into a secondary superheater 16 to be further heated therein. The main steam thus obtained is admitted into the high pressure turbine 1 through a turbine control valve 17, and the steam having been used for driving the high pressure turbine 1 is heated again in a reheater 18 to provide reheat steam which drives the low pressure turbine 2. A fuel feed pump 20 supplies fuel to the boiler, and a fuel flow control valve 19 controls the flow rate of fuel supplied from the pump 20 to the boiler. The flow rate of spray supplied into the attemperator 14 is controlled by a spray flow control valve 15.

Air for combustion is supplied to the boiler by an air fan 21, and the flow rate of air supplied from the fan 21 to the boiler is controlled by an air flow control damper 22. A portion of combustion gases having successively passed through the water wall 11, secondary superheater 16, reheater 18, primary superheater 13 and economizer 10 is supplied to the boiler again by a gas recirculating fan 23, and its flow rate is controlled by a gas recirculation flow control damper 24.

A pressure detector 101 detects the pressure of main steam and generates an output signal indicative of the main steam pressure. A temperature detector 102 detects the temperature of main steam and generates an output signal indicative of the main steam temperature. An $O_2$ detector 103 detects the concentration of $O_2$ in gases discharged from the boiler and generates an output signal indicative of the concentration of $O_2$. Another temperature detector 104 detects the temperature of reheat steam and generates an output signal indicative of the reheat steam temperature. The output signals of these detectors 101 to 104 are applied to a master controller 100. The master controller 100 produces a plant demand signal applied to various sub-loop controllers 40, 50, 60, 70, 80 and 90 on the basis of a final load demand issued from an operator console 30.

The sub-loop controllers 40, 50, 60, 70, 80 and 90 receive output signals of a generator output detector 401, a feed water flow rate detector 501, a primary superheater outlet temperature detector 601, a fuel flow rate detector 701, an air flow rate detector 801 and a gas recirculation flow rate detector 901 respectively so as to control the individual sub-loops on the basis of these inputs.

The master controller 100 and the sub-loop controllers 40, 50, 60, 70, 80 and 90 are each in the form of a digital controller and are connected to buses 200 respectively.

Figure 2:
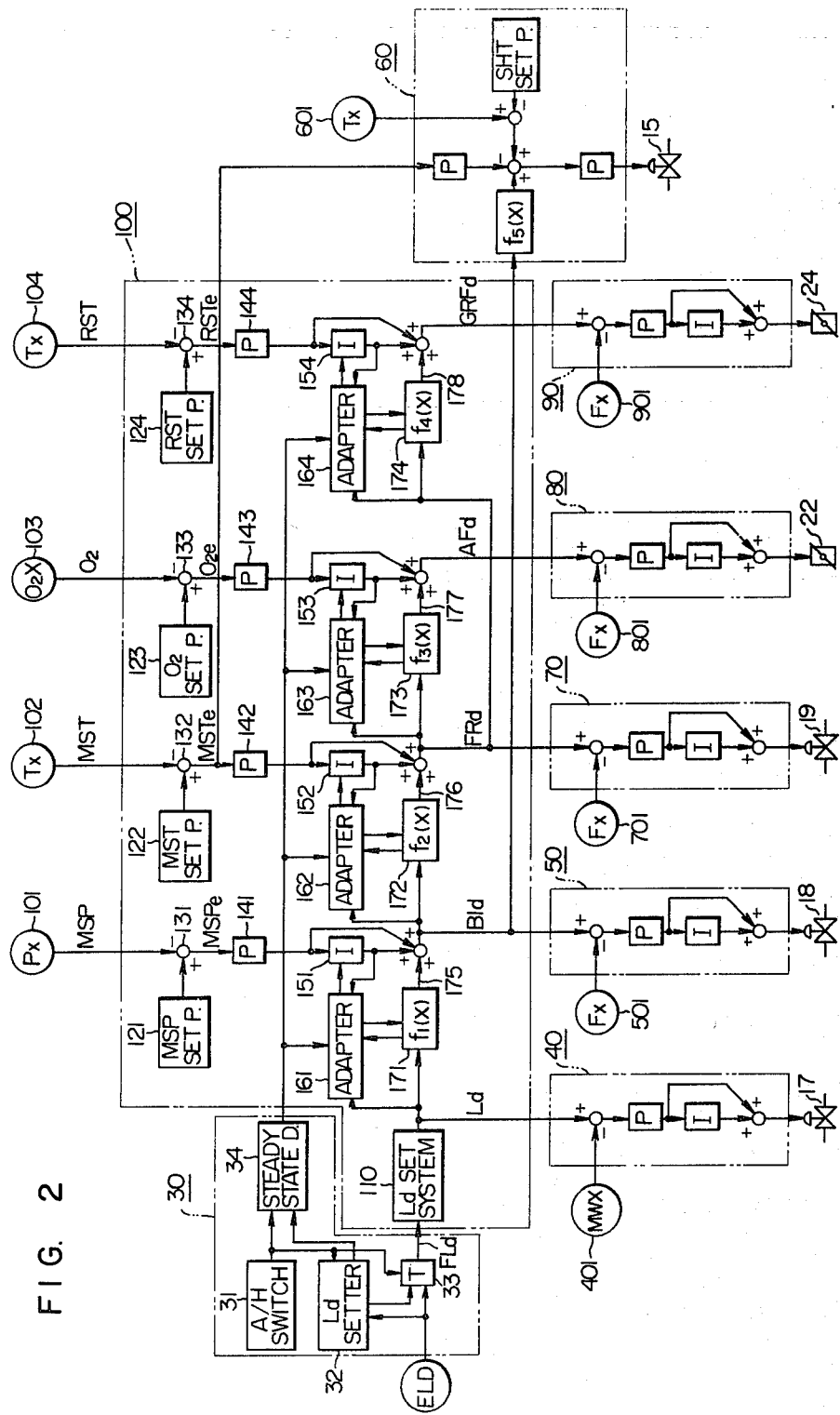
FIG. 2 is a block diagram showing the control flow in the embodiment shown in FIG. 1.

FIG. 2 is a block diagram or a control flow diagram showing the control functions of the individual controllers shown in FIG. 1.

An economic load dispatch signal (ELD) generated from a load dispatch station (not shown) is applied to the operator console 30 which comprises an auto/hand switch 31, an Ld setter 32, a transmitter 33 and a steady state detector 34. The Ld setter 32 includes therein a memory which stores the value of ELD which is variable. The memory holds the ELD value supplied in the "hand" position of the auto/hand switch 31, and the ELD value stored in this memory can be increased or decreased as desired by manipulation by the operator.

The ELD signal is transmitted from the transmitter 33 to the master controller 100 as a final load demand (FLd) when the auto/hand switch 31 is in its "auto" position. On the other hand, the value of ELD stored in the memory in the Ld setter 32 is supplied to the master controller 100 as the final load demand (Fld) when the switch 31 is in its "hand" position.

The signals indicative of the main steam pressure (MSP), main steam temperature (MST), $O_2$ concentration ($O_2$) and reheat steam temperature (RST) are also applied from the respective detectors 101 to 104 to the master controller 100. The inputs described hereinbefore are the same as those in a prior art control system for such a heat power plant. The present invention differs from the prior art control system in that a steady state signal generated from the steady state detector 34 is additionally applied to the master controller 100, so that the algebraic functions stored in the master controller 100 can be modified depending on the level of the steady state signal.

Figure 3:
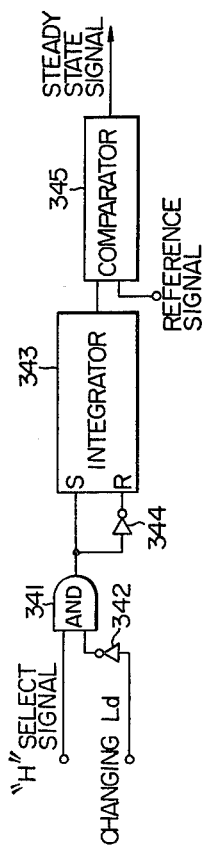
FIG. 3 is a circuit diagram showing in detail the structure of the steady state detector 34 in the block 30 shown in FIGS. 1 and 2.

FIG. 3 shows the circuit structure of the steady state detector 34. An output signal of "1" level appears from an AND gate 341 when the "hand" position of the auto/hand switch 31 is selected to apply an "H" select signal to the AND gate 341, and when no change occurs in the Ld set signal applied from the Ld setter 32 to the AND gate 341 through an inverter 342. When this AND gate output signal of "1" level lasts over more than a predetermined length of time, this is detected by a timer composed of an integrator 343 and a comparator 345, and the steady state signal of "1" level appears from the steady state detector 34. An inverter 344 is connected between the AND gate 341 and the reset terminal of the integrator 343. When the operator selects the "auto" position of the auto/hand switch 31 or when the Ld set signal changes due to manipulation by the operator, the integrator 343 is immediately reset, and the steady state signal turns into its "0" level from the "1" level.

An Ld set system 110 in the master controller 100 shown in FIG. 2 acts to limit the rate of change of FLd thereby producing an instantaneous load demand Ld. Numerals 121, 122, 123 and 124 in FIG. 2 designate the set points of MSP, MST, $O_2$ and RST respectively. Subtractors 131, 132, 133 and 134 subtract the detected values of MSP, MST, $O_2$ and RST from their set points to provide output signals corresponding to the main steam pressure error (MSPe), main steam temperature error (MSTe), $O_e$ error ($O_2e$) and reheat steam temperature error (RSTe) respectively. A first proportional adjuster 141 carries out a proportional operation on the error signal indicative of MSPe, while a first integrating adjuster 151 carries out an integrating operation on the output signal of the proportional adjuster 141, and the sum of the output signals of these adjusters 141 and 151 provides a feedback correction signal for correcting the boiler input demand (BId). A first value determining means 171 determines the then existing value 175 of BId by introducing the value of Ld into a first algebraic function $f_1(x)$. The set point of the first algebraic function $f_1(x)$ used for the determination of the then existing value of BId is modified by the function of a first adapter 161 only when the plant or process is in its steady state. A first adder 181 provides the sum of the then existing value of BId and the BId feedback correction signal to modify the boiler input demand (BId).

A second proportional adjuster 142 carries out a proportional operation on the error signal indicative of MSTe, while a second integrating adjuster 152 carries out an integrating operation on the output signal of the proportional adjuster 142, and the sum of the output signals of these adjusters 142 and 152 provides a feedback correction signal for correcting the firing ratio demand (FRd). A second value determining means 172 determines the then existing value 176 of FRd by introducing the value of BId into a second algebraic function $f_2(x)$. A second adder 182 provides the sum of the then existing value 176 of FRd and the FRd feedback correction signal to modify the firing ratio demand (FRd). Similarly, the sum of output signals of a third proportional adjuster 143 and a third integrating adjuster 153 making individual operations on the error signal indicative of $O_2e$ and the output signal of the adjuster 143 provides a feedback correction signals for correcting the air flow demand (AFd), and the then existing value 177 of AFd determined by a third value determining means 173 is added in a third adder 183 to the AFd feedback correction signal to modify the air flow demand (AFd). Similarly, the sum of output signals of a fourth proportional adjuster 144 and a fourth integrating adjuster 154 making individual operations on the error signal indicative of RSTe and the output signal of the adjuster 144 provides a feedback correction signal for correcting the gas recirculation flow demand (GRFd), and the then existing value 178 of GRFd determined by a fourth value determining means 174 is added in a fourth adder 184 to the GRFd feedback correction signal to modify the gas recirculation flow demand (GRFd).

The set point of the second algebraic function $f_2(x)$ used for the determination of the then existing value of FRd is also modified by the function of a second adapter 162. Similarly, the set point of a third algebraic function $f_3(x)$ used for the determination of the then existing value of AFd and the set point of a fourth algebraic function $f_4(x)$ used for the determination of the then existing value of GRFd are also modified by the functions of a third adapter 163 and a fourth adapter 164 respectively.

Referring to FIG. 2, the signal representative of Ld appearing from the Ld set system 110 in the master controller 100 is applied together with the output signal of the generator output detector 401 to the sub-loop controller 40 which makes a proportional plus integral (PI) operation on the error between these two inputs and provides an output signal which controls the opening of the turbine control valve 17. Similarly, the sub-loop controllers 50, 70, 80 and 90 make proportional plus integral (PI) operations on the error between the BId signal and the output signal of the feed water flow rate detector 501, the error between the FRd signal and the output signal of the fuel flow rate detector 701, the error between the AFd signal and the output signal of the air flow rate detector 801, and the error between the GRFd signal and the output signal of the gas recirculation flow rate detector 901, respectively. The output signals of these sub-loop controllers 50, 70, 80 and 90 control the feed water control valve 8, fuel control valve 19, air flow control damper 22 and gas recirculation flow control damper 24 respectively. The BId signal and the MSTe signal are applied together with the output signal of the primary superheater outlet temperature detector 601 to the sub-loop controller 60. In this sub-loop controller 60, the then existing value of the opening of the spray valve 15 obtained by introducing the value of BId into a fifth algebraic function $f_5(x)$ representing the static balance between the flow rate of feed water and the opening of the spray valve 15, the corrected value of MSTe and the then existing value of SHT corrected on the basis of the error between the SHT set point and the output signal of the primary superheater outlet temperature detector 601 are summed, and the sum is applied to a proportional adjuster to provide an output signal which controls the opening of the spray valve 15.

Figure 4A:
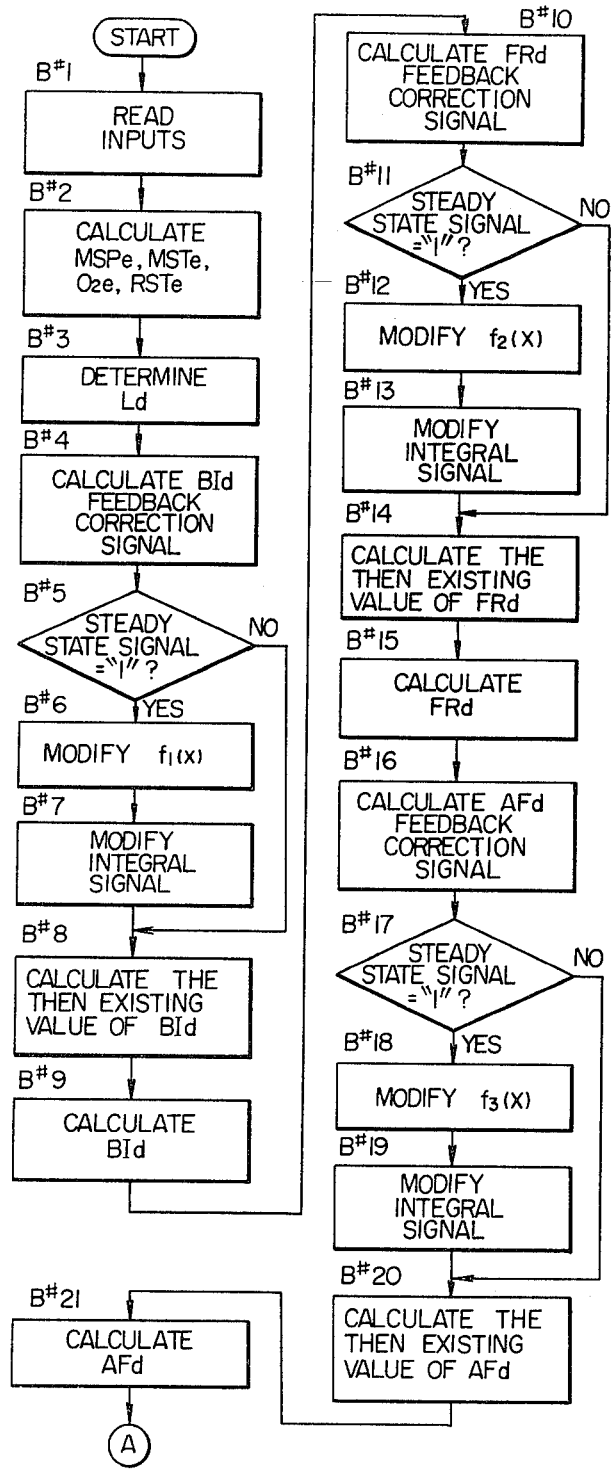
FIGS. 4A and 4B are flow charts showing the sequence of processing in the block 100 shown in FIG. 2.
Figure 4B:
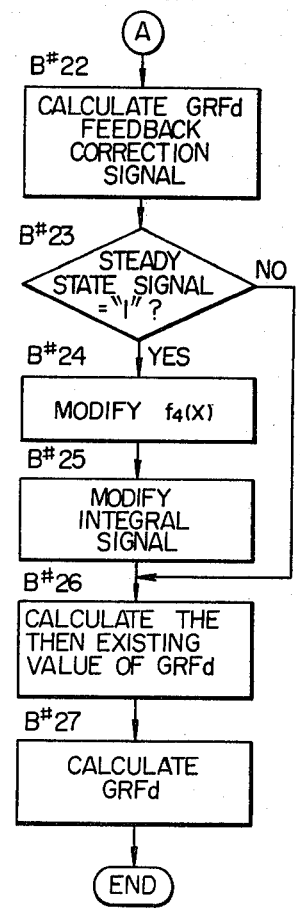

FIGS. 4A and 4B are flow charts showing the sequence of processing in the master controller 100 shown in FIGS. 1 and 2.

In step B#1 shown in FIG. 4A, the applied inputs including the MSP signal, MST signal, $O_2$ signal, RST signal, FLd signal and steady state signal are stored to be read.

In step B#2, the blocks 131, 132, 133 and 134 shown in FIG. 2 make their subtracting operation. That is, the values of MSP, MST, $O_2$ and RST and the MSP set point, MST set point, $O_2$ set point and RST set point are read out, and the former are subtracted from the latter to calculate MSPe, MSTe, $O_2e$ and RSTe respectively.

In step B#3, the Ld set system 110 shown in FIG. 2 performs its function. That is, the presence of a change in the value of Fld is checked to determine the load demand Ld. The detail of this step B#3 is shown in FIG. 5.

Figure 5:
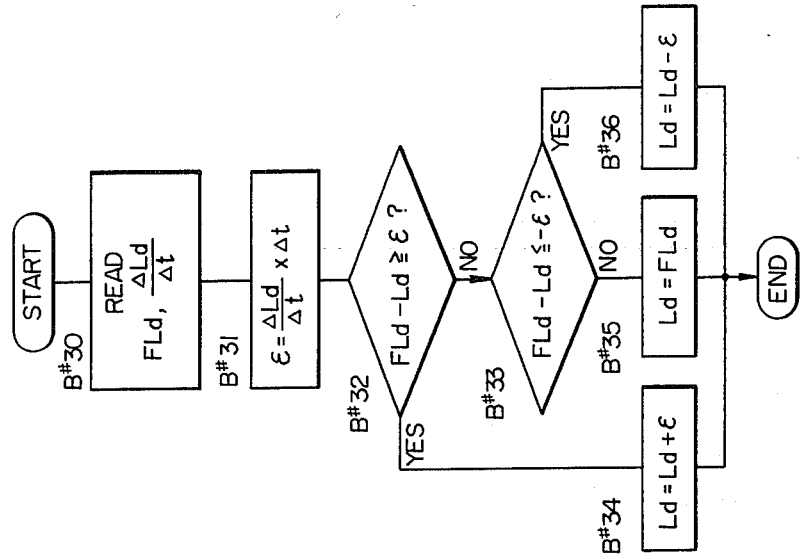
FIG. 5 is a flow chart showing in detail the sequence of processing in the step B#3 shown in FIG. 4.

In step B#30 shown in FIG. 5, the value of FLd and the value of the pre-set load change rate limit $\Delta Ld/\Delta t$ are read. In step B#31, the length of time Δt lapsed after the previous determination of Ld (which time Δt is equal to the control period of the master controller 100) is multiplied by the load change rate limit ΔLd/Δt to obtain the product $\epsilon = (\Delta Ld/\Delta t) \times \Delta t$. In steps B#32 and B#33, the difference between the value of FLd and the previously determined value of Ld is compared with the value of $\epsilon$. When $FLd - Ld \geq \epsilon$, (Ld + ε) is selected as a new value of Ld in step B#34, while when $FLd - Ld \leq -\epsilon$, (Ld − ε) is selected as a new value of Ld in step B#36. When neither of the above relations holds, the value of FLd is selected as a new value of Ld.

In step B#4 shown in FIG. 4A, the blocks 141 and 151 shown in FIG. 2 make their individual operations for calculating the BId feedback correction signal on the basis of the error MSPe. More precisely, a proportional signal $P_i$ and an integral signal $I_i$ are calculated according to the following equations (1) and (2) respectively:

$$P_i = K_1 \cdot MSPe \tag{1}$$

$$I_i = I_{i-1} + K_2 P_i \tag{2}$$

where $K_1$ and $K_2$ are predetermined coefficients, and $I_{i-1}$ is an integral signal previously calculated or obtained. Thus, the integral signal $I_i$ represents the sum of the previously calculated integral signal $I_{i-1}$ and the product obtained by multiplying the proportional signal $P_i$ by the coefficient $K_2$.

In steps B#5, B#6 and B#7, the block 161 shown in FIG. 2 executes its function. More precisely, in step B#5, whether the steady state signal appearing from the steady state detector 34 is in its "1" level or "0" level is checked. When it is proved that the steady state signal is in its "1" level, the function $f_1(x)$ is modified in step B#6, while when it is proved that the steady state signal is in its "0" level, a jump to step B#8 occurs.

Figure 6:
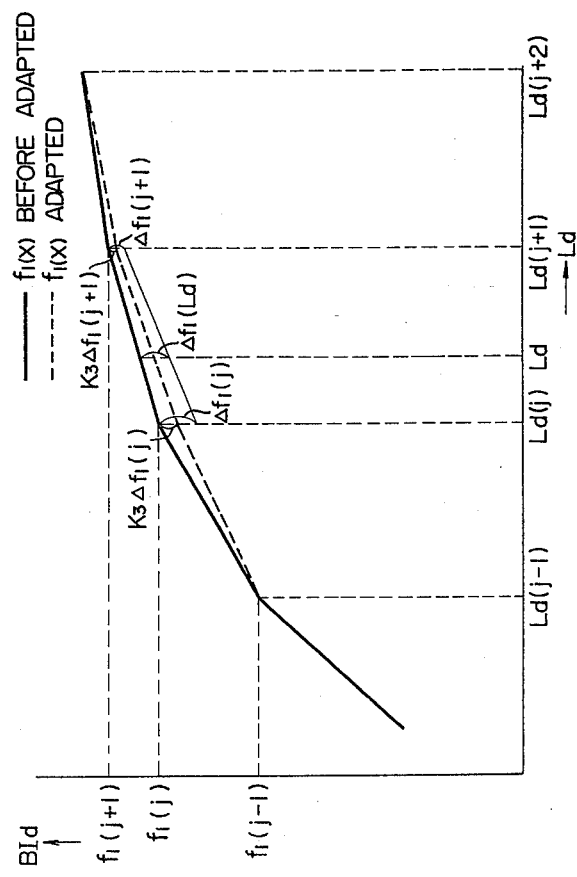
FIG. 6 is a characteristic diagram showing the function of the step B#6 shown in FIG. 4.
Figure 7:
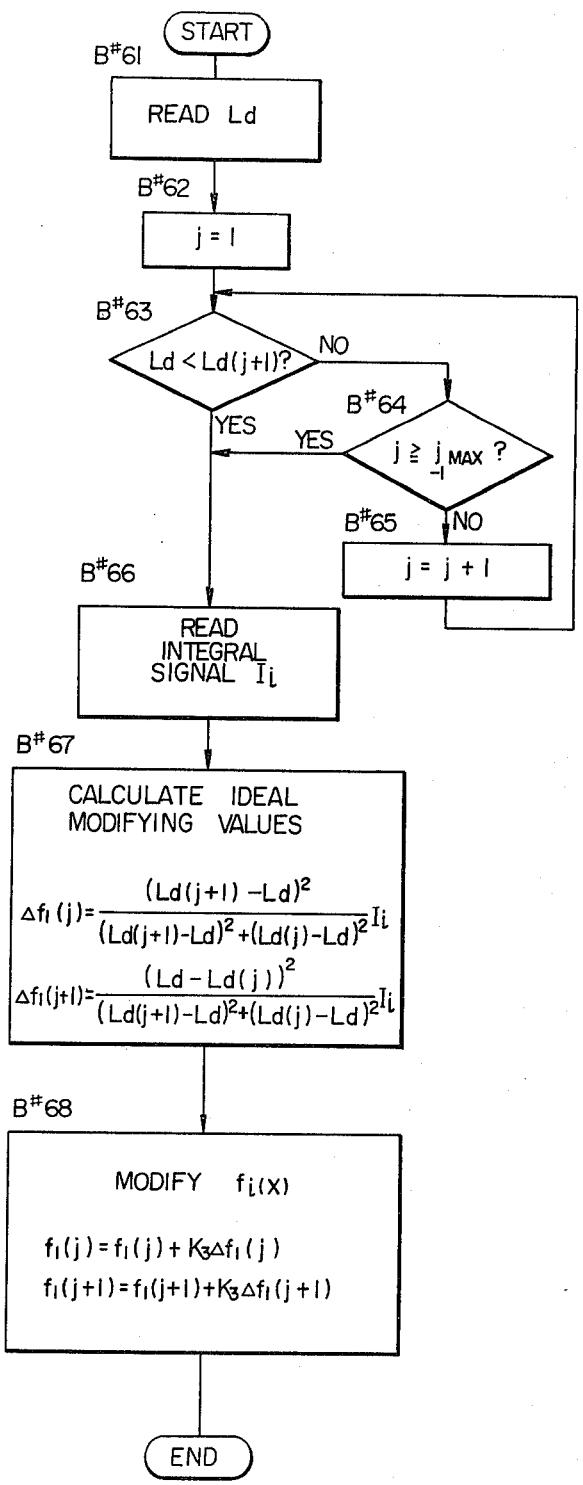
FIG. 7 is a flow chart showing in detail the sequence of processing in the step B#6 shown in FIG. 4.

FIG. 6 is a characteristic diagram to illustrate how the function $f_1(x)$ is modified in step B#6. FIG. 7 is a flow chart showing in detail the sequence of processing in step B#6.

Referring to FIG. 6, the function $f_1(x)$ representing the static balance between the load and the flow rate of feed water is initially set by the solid curve of broken pattern. Actually, a plurality of values $f_1(1), f_1(2), \ldots, f_1(j), \ldots, f_1(j_{max})$ of the set point corresponding to a plurality of values $Ld(1), Ld(2), \ldots, Ld(j), \ldots, Ld(j_{max})$ of the load demand Ld are stored in the memory.

In step B#61 shown in FIG. 7, the value of Ld determined in step B#3 is read. Then, steps B#62, B#63, B#64 and B#65 judge the location of the value of the instantaneous load demand Ld between the plural values $Ld(1), Ld(2), \ldots, Ld(j), \ldots, Ld(j_{max})$ of the load demand Ld. When it is proved that the value of the instantaneous load demand Ld lies within the range $Ld(j) \leq Ld < Ld(j+1)$ in step B#63, the set point values $f_1(j)$ and $f_1(j+1)$ are modified in steps B#66, B#67 and B#68 so as to renew or modify the function $f_1(x)$.

This manner of modification of the function $f_1(x)$ is based upon the concept described presently. According to the function $f_1(x)$ before being modified or adapted, the then existing value of the boiler input demand $f_1(Ld)$ corresponding to the load demand Ld is given by the following equation (3):

$$f_1(Ld) = \frac{f_1(j+1) - f_1(j)}{Ld(j+1) - Ld(j)} \{Ld - Ld(j)\} + f_1(j) \tag{3}$$

where $Ld(j) \leq Ld < Ld(j+1)$.

Suppose that $f^*(j)$ and $f^*(j+1)$ are the ideal values of the set point values $f_1(j)$ and $f_1(j+1)$ corresponding to the load demand values $Ld(j)$ and $Ld(j+1)$ respectively. Then, the ideal value $f_1^*(Ld)$ of the then existing value of the boiler input demand BId corresponding to the load demand Ld is expressed by the following equation (4):

$$f_1^*(Ld) = \frac{f_1^*(j+1) - f_1(j)}{Ld(j+1) - Ld(j)} \{\overline{Ld} - Ld(j)\} + f_1^*(j) \tag{4}$$

Subtraction of the equation (3) from the equation (4) provides the following equation (5):

$$f_1^*(Ld) - f_1(Ld) = \tag{5}$$
$$\frac{\{f_1^*(j+1) - f_1(j+1)\} - \{f_1^*(j) - f_1(j)\}}{Ld(j+1) - Ld(j)} \{\overline{Ld} - Ld(j)\} +$$
$$f_1^*(j) - f_1(j)$$

When $\{f_1^*(\ ) - f_1(\ )\}$ is the equation (5) is represented by $\{f_1^*(\ ) - f_1(\ )\} = \Delta f_1(\ )$, and the equation (5) is so transformed, the following equation (6) is obtained:

$$\Delta f_1(Ld) = \frac{\Delta f_1(j+1) - \Delta f_1(j)}{Ld(j+1) - Ld(j)} \{Ld - Ld(j)\} + \Delta f_1(j) \tag{6}$$

This $\Delta f_1(Ld)$ is the steady state error of the then existing value of the boiler input demand BId due to secular variations, and this error is considered to be equivalent to the value of the integral signal $I_i$ included in the BId feedback correction signal. Therefore, this integral signal $I_i$ can be used for modifying the function $f_1(x)$. Suppose that the two set point values $f_1(j)$ and $f_1(j+1)$ among the set point values of the function $f_1(x)$ include errors whose ratio is represented by the following equation (7):

$$\frac{\Delta f_1(j+1)}{\Delta f_1(j)} = \frac{Ld - Ld(j)}{Ld(j+1) - Ld} \tag{7}$$

Introduction of the equation (7) into the equation (6) to find the values $\Delta f_1(j)$ and $\Delta f_1(j+1)$ provides the following equations (8) and (9):

$$\Delta f_1(j) = \frac{\{Ld(j+1) - Ld\}^2}{\{Ld(j+1) - Ld\}^2 + \{Ld(j) - Ld\}^2} \cdot \Delta f_1(Ld) \tag{8}$$
$$= \frac{\{Ld(j+1) - Ld\}^2}{\{Ld(j+1) - Ld\}^2 + \}Ld(j) - Ld\}^2} \cdot I_i$$

$$\Delta f_1(j+1) = \frac{\{Ld - Ld(j)\}^2}{\{Ld(j+1) - Ld\}^2 + \{Ld(j) - Ld\}^2} \cdot I_i \tag{9}$$

Theoretically, an ideal function can be obtained by a single modification when the errors given by the equations (8) and (9) are directly added to the non-modified set point values $f_1(j)$ and $f_1(j+1)$ respectively to provide the set points of the new function $f_1(x)$. However, in a practical application to the heat power plant, an excessive modification may be given rise to due to the factors including plant noise. Thus, in the present embodiment, the set point values $f_1(j)$ and $f_1(j+1)$ are gradually modified according to the following equations (10) and (11) respectively:

$$f_1(j) = f_1(j) + K_3 \cdot \Delta f_1(j) \quad (10)$$

$$f_1(j+1) = f_1(j+1) + K_3 \cdot \Delta f_1(j+1) \quad (11)$$

where $K_3$ is a coefficient satisfying the relation $0 < K_3 < 1$.

The dotted curve shown in FIG. 6 represents the new function $f_1(x)$ obtained by modifying the set point values $f_1(j)$ and $f_1(j+1)$ according to the equations (10) and (11). It will be seen in FIG. 6 that the amount $K_3 \cdot \Delta f_1(j)$ added to modify the set point $f_1(j)$ and the amount $K_3 \cdot \Delta f_1(j+1)$ added to modify the set point $f_1(j+1)$ are respectively inversely proportional to the difference between the instantaneous load demand values Ld and Ld(j) and to the difference between the instantaneous load demand values Ld and Ld(j+1). In the embodiment of the present invention, all of the set points $f_1(1)$, ..., $f_1(j)$, ..., $f_1(j_{max})$ of the function $f_1(x)$ are not modified, but the set points $f_1(j)$ and $f_1(j+1)$ corresponding respectively to the load demands Ld(j) and Ld(j+1) close to the actual instantaneous load demand Ld are only modified. Thus, the function $f_1(x)$ can be finely modified, and even when the function $f_1(x)$ preset before the initiation of the plant operation is inadequate, it can be precisely modified during the continuous plant operation.

The explanation of the sequence of modification of the set points of the function $f_1(x)$ in the embodiment of the present invention will be continued with reference to FIG. 7 again. In step B#66, the integral signal $I_i$ included in the BId feedback correction signal is read. In step B#67, the values of $\Delta f_1(j)$ and $\Delta f_1(j+1)$ used for the ideal modification of the set points $f_1(j)$ and $f_1(j+1)$ are arithmetically calculated according to the equations (8) and (9) respectively. In step B#68, the set points $f_1(j)$ and $f_1(j+1)$ are modified according to the equations (10) and (11) respectively.

Referring to FIG. 4A again, the integral signal $I_i$ in the BId feedback correction signal is modified in step B#7. As described hereinbefore, the set points of the function $f_1(x)$ are modified in such a manner as to minimize the value of the BId feedback correction signal. Thus, in step B#7, the integral signal $I_i$ is modified according to the following equation (12):

$$I_i = (1 - K_3) I_i \quad (12)$$

In step B#8 shown in FIG. 4A, the block 171 shown in FIG. 2 executes its function for determining the then existing value $f_1(Ld)$ of BId on the basis of the function $f_1(x)$ and the instantaneous load demand Ld. More precisely, this $f_1(Ld)$ is arithmetically calculated according to the following equation (13):

$$f_1(Ld) = \frac{f_1(j+1) - f_1(j)}{Ld(j+1) - Ld(j)} \{Ld - Ld(j)\} + f_1(j) \quad (13)$$

The meaning of this equation (13) is that linear interpolation is applied to the set points $f_1(j)$ and $f_1(j+1)$ of the function $f_1(x)$ so as to calculate the then existing value $f_1(Ld)$ of BId corresponding to the instantaneous load demand Ld.

In step B#9 shown in FIG. 4A, the function of the block 181 shown in FIG. 2 is executed. That is, in this step, the then existing value of BId obtained in step B#7 is added to the BId feedback correction signal to arithmetically calculate the boiler input demand BId according to the following equation (14):

$$BId = f_1(Ld) + P_i + I_i \quad (14)$$

In step B#10 shown in FIG. 4A, the blocks 142 and 152 execute thier functions to arithmetically calculate the FRd feedback correction signal on the basis of the value of MSTe.

Steps B#11, B#12 and B#13 shown in FIG. 4A execute the function of the block 162 shown in FIG. 2. In step B#11, judgement is made as to whether the steady state signal is in its "1" level or not. When it is proved that the steady state signal is in its "1" level in step B#11, the set point of the function $f_2(x)$ representing the static balance between the flow rate of feed water and the flow rate of fuel is modified in step B#12, and then, the integral signal $I_i$ in the FRd feedback correction signal calculated in step B#10 is modified in step B#13. The practical manner of this modification is entirely similar to that described in detail with reference to the steps B#6 and B#7, and its detailed description is therefore unnecessary.

In step B#14, the block 172 shown in FIG. 2 executes its function to arithmetically calculate $f_2(BId)$, which is the then existing value of FRd, on the basis of the value of BId obtained in step B#9 and the function $f_2(x)$ modified in step B#12. The manner of this calculation is also similar to that described with reference to step B#8.

In step B#15, the block 182 shown in FIG. 2 executes its function. That is, $f_2(BId)$ which is the then existing value of FRd is added to the FRd feedback correction signal to obtain the value of FRd.

In step B#16, the blocks 143 and 153 shown in FIG. 2 execute their functions. In steps B#17, B#18 and B#19, the block 163 shown in FIG. 2 executes its function. In step B#20, the block 173 shown in FIG. 2 executes its function, and in step B#21, the block 183 shown in FIG. 2 executes its function. In these steps, the then existing value of the air flow demand AFd is arithmetically calculated on the basis of the value of FRd obtained in step B#15 and the function $f_3(x)$ representing the static balance between the flow rate of fuel and the flow rate of air, and the AFd feedback correction signal is arithmetically calculated on the basis of the value of $O_2e$, so that the value of AFd is arithmetically calculated as the sum of the then existing value of AFd and the value of the AFd feedback correction signal. The manner of modification of the set point of the function $f_3(x)$ in step B#18 and the manner of modification of the integral signal $I_i$ in the AFd feedback correction signal in step B#19 are also entirely similar to those described with reference to steps B#6 and B#7.

Referring to FIG. 4B, the blocks 144 and 154 shown in FIG. 2 execute their functions in step B#22 and the block 164 shown in FIG. 2 executes its function in steps B#23, B#24 and B#25. Then, the block 174 shown in FIG. 2 executes its function in step B#26, and the block 184 shown in FIG. 2 executes its function in step B#27. In these steps, the value of $f_4(FRd)$, which is the then existing value of the gas recirculation flow demand GFRd, is arithmetically calculated on the basis of the value of FRd and the function $f_4(x)$ representing the static balance between the flow rate of fuel and the flow rate of recirculated gases, and the GRFd feedback correction signal is arithmetically calculated on the basis of the value of RSTe, so that the value of GRFd is arithmetically calculated as the sum of the then existing value of $f_4(FRd)$ and the value of the GRFd feedback correction signal. The manner of modification of the set point of the function $f_4(x)$ in step B#24 and the manner of modification of the integral signal $I_i$ in the GRFd feedback correction signal in step B#25 are also entirely similar to those described with reference to steps B#6 and B#7.

In the embodiment described hereinbefore, the steady state signal of "1" level appears from the steady state detector 34 when the auto/hand switch 31 associated with the Ld setter 32 setting the load demand Ld is changed over to the "hand" position, and when the process is proved to be maintained in its steady state because of no change in the Ld set signal over more than a predetermined length of time. When the steady state signal of "1" level appears, the set points of the functions for determining the feed forward control signal are modified in the aforementioned embodiment. However, the manner of judgment of the steady state of the process is in no way limited to that described hereinbefore.

For example, the process may be judged to be maintained in its steady state when the value of the final load demand FLd for the process does not change over more than a predetermined length of time. That is, in the case of the aforementioned embodiment applied to the control system for the heat power plant, the process is proved to be maintained in its steady state when the value of FLd does not change over more than a predetermined period of time regardless of whether the auto/hand switch 31 associated with the Ld setter 32 setting the load demand Ld is in its "hand" position or not.

When a more accurate judgment of the steady state is desired to more accurately modify the set points of the functions used for the determination of the feed forward control signal, the variance of any one of the process parameters within a predetermined period of time may be arithmetically calculated, and the process may be judged to be maintained in the steady state when the value of the variance is less than a predetermined reference value.

Figure 8:
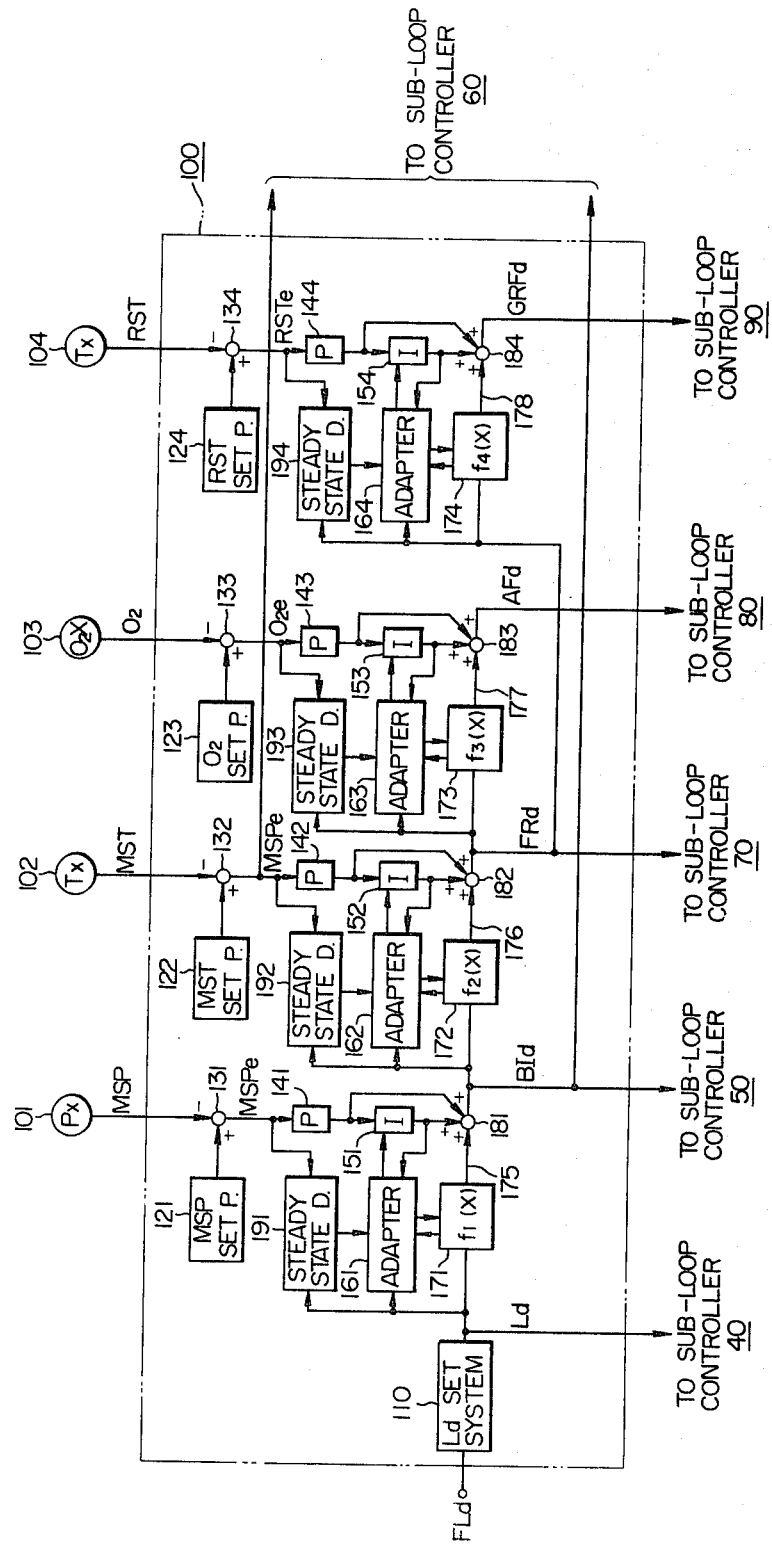
FIG. 8 is a block diagram showing the control flow in another embodiment of the present invention.

FIG. 8 shows a modification of the aforementioned embodiment of the present invention applied to the control system for the heat power plant. In the modification shown in FIG. 8, the variance, within a predetermined period of time, of each of the errors calculated from the detected values of the main steam pressure MSP, main steam temperature MST, $O_2$ concentration $O_2$ and reheat steam temperature RST is detected, and the variance, within the predetermined period of time, of each of the values of the demands used as the reference values for the calculation of the then existing values of the demands is also detected, so that, when both the variance of the former and the variance of the latter are less than their predetermined reference values, the individual sub-loop control systems are proved to be maintained in the steady state, and the set points of the functions are then modified.

Referring to FIG. 8, a first steady state detector 191 detects whether the variance of each of MSPe and Ld is less than a reference value, and a second steady state detector 192 detects whether the variance of each of MSTe and BId is less than a reference value. A third steady state detector 193 detects whether the variance of each of $O_2$e and FRd is less than a reference value, and a fourth steady state detector 194 detects whether the variance of each of RSTe and FRd is less than a reference value.

Other numerals designate the same parts as those appearing in FIG. 2 since FIG. 8 is a modification of FIG. 2, and in FIG. 8, the steady state detector 34 shown in FIG. 2 is eliminated.

Figure 9:
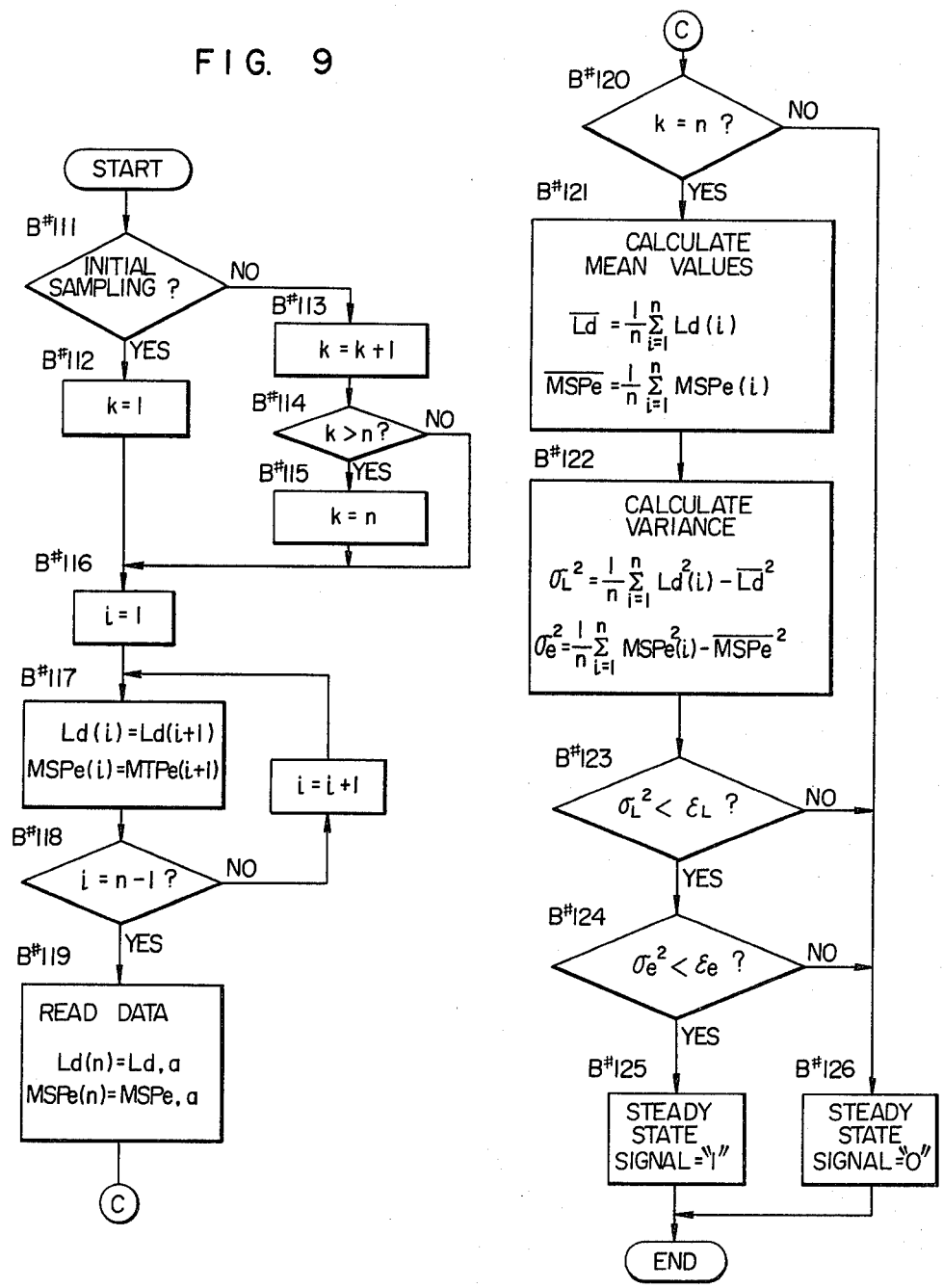
FIG. 9 is a flow chart showing the sequence of processing for performing the function of the block 191 shown in FIG. 8.

FIG. 9 shows the sequence of processing in the first steady state detector 191 shown in FIG. 8. In a series of steps B#111 to B#115, judgment is made as to whether n sampled data used for the calculation of the variance have already been obtained. More precisely, in step B#112, k=1 is set in a counter when the data sampling is proved to be initial sampling in step B#111. Step B#113 is a counting-up step to set k=k+1 in the counter. The number n of samples is determined by the process dynamics.

In a series of steps B#116 to B#118, the previously sampled and stored data are renewed. In step B#119, new data of Ld and MSPe are read. In step B#120, judgment is made as to whether n sampled data have been read. When the judgment in step B#120 proves that k=n, the mean values of Ld and MSPe are arithmetically calculated in step B#121. When, on the other hand, it is proved that the n sampled data have not yet been read, the steady state signal is turned into its "0" level in step B#126. In step B#122, the variance $\sigma_L^2$ of the n sampled data of Ld and the variance $\sigma_e^2$ of the n sampled data of MSPe are arithmetically calculated on the basis of the means values $\overline{Ld}$ and $\overline{MSPe}$ of Ld and MSPe calculated in step B#121 and the n sampled data Ld(i) and MSPe(i). In step B#123, judgment is made as to whether the variance $\sigma_L^2$ calculated in step B#122 is less than a predetermined reference value $\epsilon_L$ or not. In step B#124, judgment is made as to whether the variance $\sigma_e^2$ calculated in step B#122 is less than a predetermined reference value $\epsilon_e$ or not. When both of $\sigma_L^2$ and $\sigma_e^2$ are proved to be less than their reference values $\epsilon_L$ and $\epsilon_e$ respectively, the steady state signal of "1" level appears from the steady state detector 191 in step B#125 since the process is in the steady state in such a case. On the other hand, when one of $\sigma_L^e$ and $\sigma_e^2$ is more than its reference value, the steady state signal is turned into its "0" level.

The overall sequence of processing in the master controller 100 in the embodiment shown in FIG. 8 differs from the control flow shown in FIG. 2 in the points described presently. In the first place, the steps of arithmetic calculation carried out by the steady state detector 191 are interposed between the steps B#4 and B#5 shown in FIG. 4A. In the second place, the steps of arithmetic calculation carried out by the steady state detector 192 are interposed between the steps B#10 and B#11 shown in FIG. 4A. In the third place, the steps of arithmetic calculation carried out by the steady state detector 193 are interposed between the steps B#16 and B#17 shown in FIG. 4A. In the fourth place, the steps of arithmetic calculation carried out by the steady state detector 194 are interposed between the steps B#22 and B#23 shown in FIG. 4B. The arithmetic calculations carried out by these steady state detectors 192, 193 and 194 are essentially the same as that carried out by the steady state detector 191 except that different data are processed for the calculation of the variance. Therefore, any detailed description of the sequence of arithmetic calculations in these detectors is unnecessary.

In the step B#6 in FIG. 4A, the function $f_1(x)$ has been modified on the basis of the then existing value of the load demand Ld. In the embodiment shown in FIG.

8, however, the function $f_1(x)$ is modified on the basis of the mean value $\overline{Ld}$ of Ld calculated in the step #121 in FIG. 9. That is, the mean value $\overline{Ld}$ is read instead of reading the value of Ld as in the step B#61 shown in FIG. 7, and in lieu of the equations (8) and (9) used for the arithmetic calculations of the ideal modifying values in the step B#67 shown in FIG. 7, the following equations (15) and (16) are used:

$$\Delta f_1(j) = \frac{\{Ld(j+1) - \overline{Ld}\}^2}{\{Ld(j+1) - \overline{Ld}\}^2 + \{Ld(j) - \overline{Ld}\}^2} \cdot I_i \quad (15)$$

$$\Delta f_1(j+1) = \frac{\{\overline{Ld} - Ld(j)\}^2}{\{Ld(j+1) - \overline{Ld}\}^2 + \{Ld(j) - \overline{Ld}\}^2} \cdot I_i \quad (16)$$

According to the embodiment described with reference to FIGS. 8 and 9, the variance of the process parameter is arithmetically calculated for each of the control loops or blocks arithmetically calculating the demand signals such as the BId, FRd, AFd and GRFd signals so as to judge whether the process is in the steady state or not, and only when the process is proved to be maintained in the steady state, the functions used for the arithmetic calculations of the then existing values of these demand signals are modified. Therefore, the function modification timing can be accurately detected, and the functions can be modified more quickly than in the embodiment described with reference to FIGS. 2 to 7.

We claim:

1. A method for the adaptive control of a process comprising the steps of generating in accordance with a predetermined function a feed forward control signal for controlling a process variable on the basis of a process demand, generating an output representing a measured value of the process variable, generating an output representative of a predetermined value of the process variable, generating a feedback correction signal in accordance with a difference between the outputs of the measured and predetermined values of the process variable, controlling the process variable in accordance with the feed forward control signal and the feedback correcting signal, determining whether the process is in a steady state or not, and modifying the predetermined function utilized for generating the feed forward control signal when it is determined that the process is in the steady state, the modifying of the predetermined function utilized for generating the feed forward control signal being effected so as to reduce the amount of the feedback correction signal, and further comprising the step of modifying the feedback correction signal in accordance with the amount of modification of the predetermined function utilized in generating the feed forward control signal when the process is determined to be in the steady state.

2. A method according to claim 1, wherein the step of controlling the process variable includes summing the feed forward control signal and the feedback correction signal and modifications thereof for producing a summation value for controlling the process variable.

3. A method according to claim 2, wherein the feed forward control signal is generating on the basis of a process demand signal, and the step of determining whether the process is in a steady state or not includes determining whether any change occurs in the process demand signal over a predetermined period of time, the process being determined to be in the steady state when no change occurs in the process demand signal for the predetermined period of time.

4. A method according to claim 2, wherein the process is determined to be in a steady state or not by determining whether the process variable varies less than a predetermined reference value within a predetermined period of time, the process being determined to be in the steady state when the variance of the process variable is less than the predetermined reference value for the predetermined period of time.

5. A method according to one of claims 2, 3 or 4 wherein the steps of generating a feed forward control signal includes storing a plurality of desired values of a feed forward control signal corresponding, respectively, to a plurality of values of a process demand signal as set points of a predetermined alegabraic function and generating the feed forward control signal on the basis of the function determined by the set points and an instantaneous value of the process demand signal, and modifying the stored set points of the function utilized for generating the feed forward control signal when the process is determined to be in the steady state.

6. A method according to claim 5, wherein the feedback correction signal is modified in dependence on the amount of modification of the set points of the function utilized for generating the feed forward control signal when the process is determined to be in the steady state, and modifying the value of the feed forward control signal in accordance with an instantaneous value of the process demand signal by linear interpolation of the set points of the modified function utilized for generating the feed forward control signal.

7. A method according to claim 6, wherein only the set points of the plural set points of the function utilized for generating the feed forward control signal which are close to the instantaneous value of the process demand signal are modified when the process is determined to be in the steady state.

8. A method according to claim 7, wherein each of the set points of the function utilized for generating the feed forward control signal which are modified are modified by an amount which is inversely proportional to the difference between the instantaneous value of the process demand signal and the process demand corresponding to the associated set point.

9. A method according to claim 1, wherein the process includes a plurality of process variables, at least selected ones of the process variables being controlled by an associated feed forward control signal and feedback correction signal, the feed forward control signal being modified when it is determined that the process is in the steady state.

10. An adaptive control system for controlling a process comprising function generator means for generating in accordance with a predetermined function a feed forward control signal for controlling a process variable on the basis of a process demand, means for generating an output representing a measured value of the process variable, means for generating an output representative of a predetermined value of the process variable, feedback correction signal means responsive to the outputs of the measured and predetermined values of the process variable for generating a feedback correction signal in accordance with a difference between the outputs, control means responsive to the feed forward control signal and feedback correcting signal for controlling the process variable in accordance therewith, judging means for determining whether the process is in a steady state or not, and modifying means responsive to the judging means determining that the process is in the steady state for modifying the predetermined function of the function generator means, the modifying means being responsive to the judging means determining that the process is in the steady state for modifying the predetermined function of the function generator means so as to reduce the amount of the feedback correction signal, and the modifying means being responsive to the judging means determining that the process is in the steady state for modifying the feedback correction signal means so as to modify the feedback correction signal in accordance with the amount of modification of the predetermined function of the function generator means.

11. An adaptive control system according to claim 10, wherein the control means sums the feed forward control signal and the feedback correction signal and modifications thereof for producing a summation value for controlling the process variable.

12. An adaptive control system according to claim 11, wherein the function generator means is responsive to a process demand signal for generating the feed forward control signal, and the judging means for determining whether the process is in a steady state or not includes means for detecting whether any change occurs in the process demand signal over a predetermined period of time.

13. An adaptive control system according to claim 12, wherein the means for determining whether any change occurs in the process demand signal over a predetermined period of time includes integrating means.

14. An adaptive control system according to claim 11, wherein the judging means for determining whether the process is in a steady state or not includes means for detecting whether the process variable varies less than a predetermined reference value within a predetermined period of time.

15. An adaptive control system according to claim 10, wherein the process includes a plurality of process variables, and comprising a respective function generator means, feedback correction signal means, control means, judging means and modifying means for at least selected ones of the process variables.

* * * * *